United States Patent
Kang et al.

(10) Patent No.: US 7,924,634 B2
(45) Date of Patent: Apr. 12, 2011

(54) REPEATER OF GLOBAL INPUT/OUTPUT LINE

(75) Inventors: Tae Jin Kang, Suwon-si (KR); Seung Hyun Ryu, Suwon-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 284 days.

(21) Appl. No.: 12/217,203

(22) Filed: Jul. 1, 2008

(65) Prior Publication Data

US 2009/0153262 A1 Jun. 18, 2009

(30) Foreign Application Priority Data

Dec. 18, 2007 (KR) .................. 10-2007-0133641

(51) Int. Cl.
*G11C 7/10* (2006.01)
(52) U.S. Cl. ............... 365/189.17; 365/189.18; 365/198
(58) Field of Classification Search ............ 365/189.17, 365/189.18, 189.19, 198
See application file for complete search history.

(56) References Cited

U.S. PATENT DOCUMENTS

| 4,680,609 | A | * | 7/1987 | Calder et al. ............... 257/69 |
| 4,777,389 | A | * | 10/1988 | Wu et al. ................. 326/28 |
| 4,816,773 | A | | 3/1989 | Pricer |
| 5,218,239 | A | * | 6/1993 | Boomer .................. 326/27 |
| 5,300,835 | A | * | 4/1994 | Assar et al. ............... 326/68 |
| 6,313,663 | B1 | * | 11/2001 | Mueller et al. ............ 326/83 |
| 6,857,039 | B1 | * | 2/2005 | Makino ................ 710/305 |
| 7,317,337 | B2 | | 1/2008 | Na |

FOREIGN PATENT DOCUMENTS

KR 10-2005-0000990 A 1/2005

\* cited by examiner

*Primary Examiner* — J. H. Hur
(74) *Attorney, Agent, or Firm* — John P. White; Cooper & Dunham LLP

(57) ABSTRACT

A repeater of a global input/output line includes a data transmitter including first and second drivers for outputting data signals of the global input/output line through different transmission routes in response to a transmission direction control signal, and a third driver for driving the global input/output line in response to an output signal of the data transmitter.

10 Claims, 2 Drawing Sheets

US 7,924,634 B2

REPEATER OF GLOBAL INPUT/OUTPUT LINE

TECHNICAL FIELD

The present disclosure relates to a semiconductor device, and more particularly, to a repeater of a global input/output line.

BACKGROUND

In a semiconductor memory device, a global input/output line serves as a data transmission line for transmitting data between an input/output pin and a memory core during a read or write operation.

If the input/output line has a long length, great load is applied thereto so that the swing of the data signal, which is transmitted through the global input/output line, is prolonged during the read and write operation, thereby deteriorating the operational margin.

In order to solve this problem, a repeater is provided at a middle part of the global input/output line to improve the operational speed by distributing the load. In addition, it is necessary to transmit data in one direction from the global input/output line connected to the repeater according to the read or write operation relative to a bank.

FIG. 1 is a circuit view of a repeater provided in a global input/output line according to the related art.

As shown in FIG. 1, the conventional repeater of the global input/output line has a simple inverter logic.

In the case of transmitting data from A to B, if a transmission direction control signal CTRL has a high level, a control signal CTRLB has a low level. At this time, NMOSs of pull-down drivers N1 and N2 are turned ON and PMOSs of pull-up drivers P1 and P2 are also turned ON, so that data are transmitted from A to B. In addition, NMOSs of pull-down drivers N3 and N4 are turned OFF and PMOSs of pull-up drivers P3 and P4 are also turned OFF, so that data transmission from B to A is blocked.

In the case of transmitting data from B to A, if a transmission direction control signal CTRL has a low level, a control signal CTRLB has a high level. At this time, NMOSs of pull-down drivers N3 and N4 are turned ON and PMOSs of pull-up drivers P3 and P4 are also turned ON, so that data are transmitted from B to A. In addition, NMOSs of pull-down drivers N1 and N2 located in an "A" area are turned OFF and PMOSs of pull-up drivers P1 and P2 are also turned OFF, so that data transmission from A to B is blocked.

That is, the data can be transmitted from A to B or vice versa according to circumstances, so that the global input/output line can transmit the data signals in bi-direction.

However, such a repeater has a simple inverter structure, so it may cause great current consumption and increase delay time. That is, since the PMOS of the pull-up driver P2 and the NMOS of the pull-down driver N2 as well as the PMOS of pull-up driver P3 and the NMOS of the pull-down driver N3 are aligned in series in the repeater, driving force of a MOS transistor is reduced by a half.

BRIEF SUMMARY

In an aspect of the present disclosure, a repeater of a global input/output line, capable of reducing current consumption and delay time, is provided.

In an embodiment of this disclosure, a repeater of a global input/output line comprises a data transmitter including first and second drivers for outputting data signals of the global input/output line through different transmission routes in response to a transmission direction control signal, and a data output unit including a third driver for driving the global input/output line in response to an output signal of the data transmitter.

In another embodiment, a repeater of a global input/output line comprises a first data transmitter including first and second drivers for outputting data signals of the global input/output line through different transmission routes in response to a transmission direction control signal, a third driver for driving the global input/output line in response to an output signal of the first data transmitter, a second data transmitter including fourth and fifth drivers for outputting data signals of the global input/output line through different transmission routes in response to the transmission direction control signal, and a second data output unit including a sixth driver for driving the global input/output line in response to an output signal of the second data transmitter, wherein the first data transmitter and the third driver or the second data transmitter and the sixth driver are enabled according to the transmission direction control signal to allow the global input/output line to transmit data signals in bi-direction.

The repeater of the global input/output line according to the present invention can reduce current consumption and can minimize delay time of data while maintaining bi-directional transmission.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION OF PREFERRED EMBODIMENTS

Hereinafter, the present invention will be described in detail through examples and exemplary embodiments. The embodiments are just for exemplifying the present invention, and the scope of right to be protected of the present invention is not limited by them.

Figure 1:
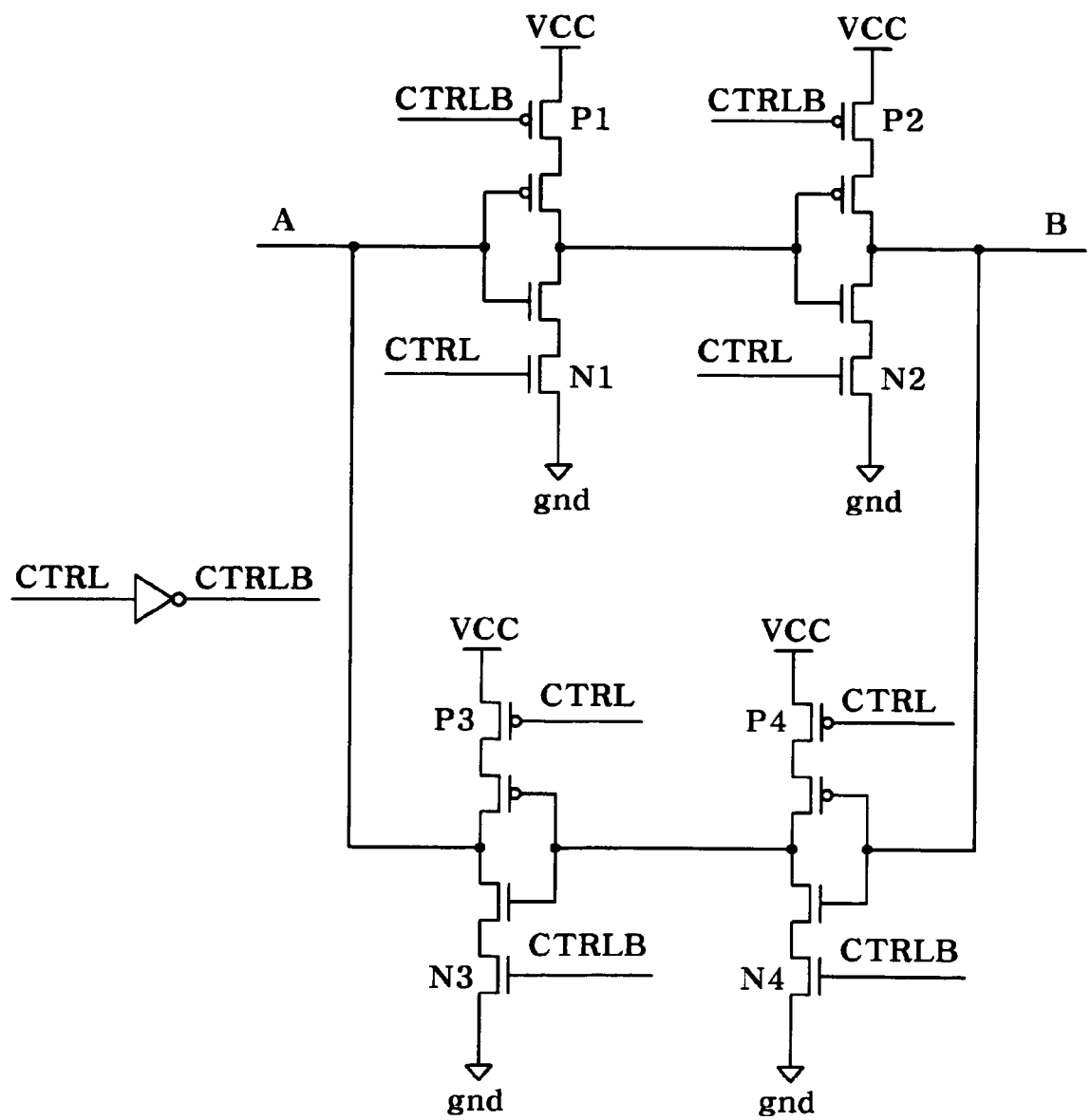
FIG. 1 is a circuit view of a conventional repeater provided in a global input/output line.
Figure 2:
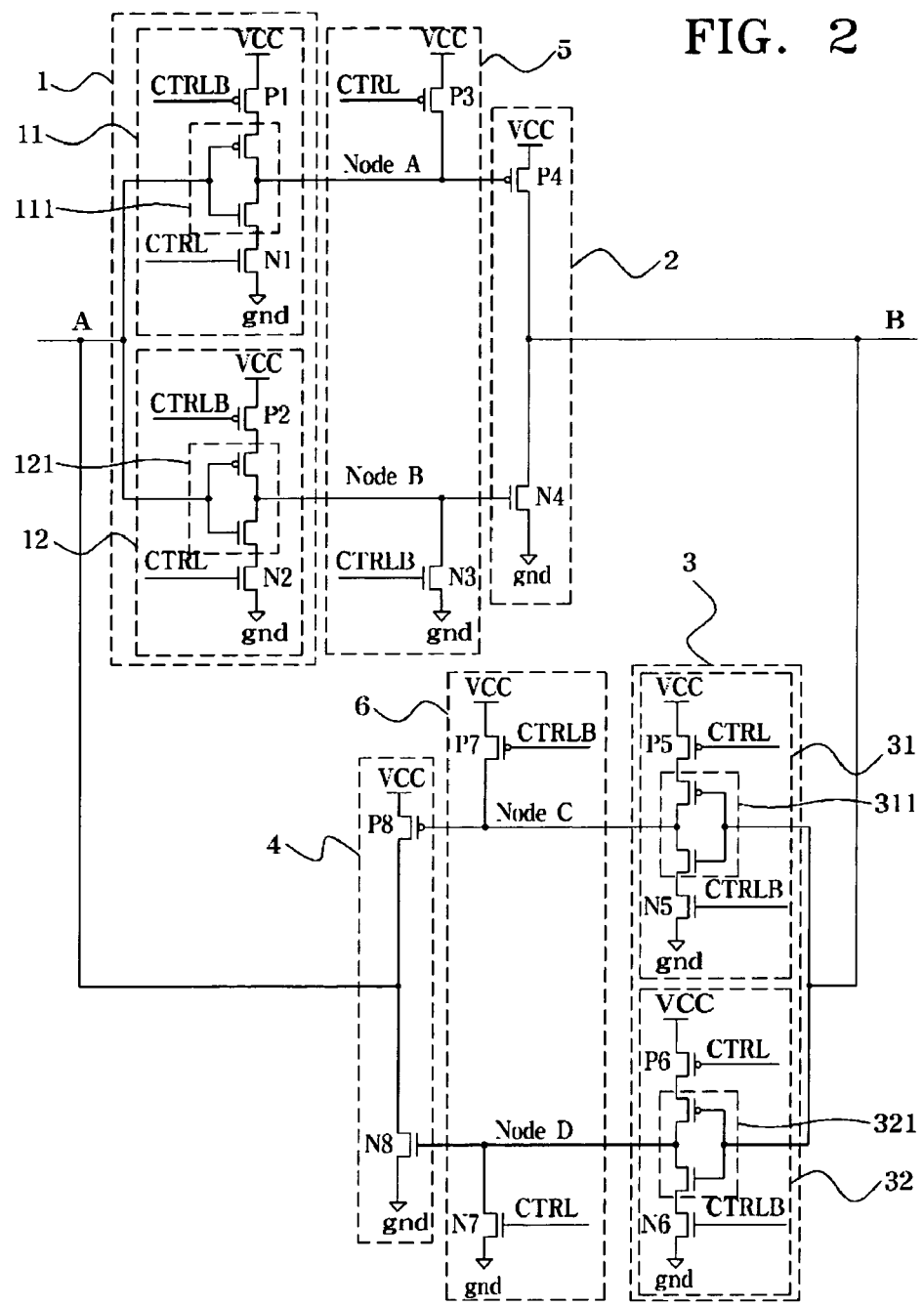
FIG. 2 is a circuit view of a repeater provided in a global input/output line according to an embodiment of the present invention.

FIG. 2 is a circuit view of a repeater provided in a global input/output line according to an embodiment of the present disclosure.

As shown in FIG. 2, the repeater of the present invention includes a first data transmitter 1 having first and second drivers 11 and 12 for outputting data signals of the global input/output line through different transmission routes (including Node A and Node B, respectively) in a first signal direction (A to B) in response to transmission direction control signals CTRL and CTRLB, and a third driver 2 for driving the global input/output line in response to the output signal of the first data transmitter 1.

In addition, the repeater of the present invention includes a second data transmitter 3 having fourth and fifth drivers 31 and 32 for outputting data signals of the global input/output line through different transmission routes (including Node C and Node D, respectively) in a second signal direction (B to A) in response to the transmission direction control signals CTRL and CTRLB, and a sixth driver 4 for driving the global input/output line in response to the output signal of the second data transmitter 3.

The first data transmitter 1 and the third driver 2 or the second data transmitter 3 and the sixth driver 4 are enabled according to the transmission direction control signals CTRL and CTRLB to transmit data signals of the global input/output line in bi-direction.

In addition, the repeater of the present invention further includes a first driver controller 5 for controlling the third driver 2 in response to the transmission direction control signals CTRL and CTRLB, and a second driver controller 6 for controlling the sixth driver 4 in response to the transmission direction control signals CTRL and CTRLB.

The first driver controller 5 includes pull-up driver P3 and pull-down driver N3 for pull-up driving the output terminal of the first driver 11 and pull-down driving the output terminal of the second driver 12, respectively, in response to the transmission direction control signals CTRL and CTRLB. The second driver controller 6 includes pull-up driver P7 and pull-down driver N7 for pull-up driving the output terminal of the fourth driver 31 and pull-down driving the output terminal of the fifth driver 32, respectively, in response to the transmission direction control signals CTRL and CTRLB.

In addition, as shown in FIG. 2, the first driver 11 includes a first buffer unit 111, a first enable unit P1, and a second enable unit N1. The first buffer unit 111 transfers data signals of the global input/output line. The first enable unit P1 is connected between a source voltage and the first buffer unit. The second enable unit N1 is connected between the first buffer unit and a ground voltage. The second driver 12 includes a second buffer unit 121, a third enable unit P2 and a fourth enable unit N2. The second buffer unit 121 transfers data signals of the global input/output line. The third enable unit P2 is connected between a source voltage and the second buffer unit. The fourth enable unit N2 is connected between the second buffer unit and a ground voltage. The first driver 11 and the second driver 12 pull-up/pull-down drive the global input/output line in response to the transmission direction control signals CTRL and CTRLB. In addition, the fourth driver 31 includes a third buffer unit 311, a fifth enable unit P5, and a sixth enable unit N5. The third buffer unit 311 transfers data signals of the global input/output line. The fifth enable unit P5 is connected between a source voltage and the third buffer unit. The sixth enable unit N5 is connected between the third buffer unit and a ground voltage. The fifth driver 32 includes a fourth buffer unit 321, a seventh enable unit P6, and a eighth enable unit N6. The fourth buffer unit 321 transfers data signals of the global input/output line. The seventh enable unit P6 is connected between a source voltage and the fourth buffer unit. The eighth enable unit N6 is connected between the fourth buffer unit and a ground voltage. The fourth driver 31 and the fifth driver 32 pull-up/pull-down drive the global input/output line in response to the transmission direction control signals CTRL and CTRLB.

Further, the third and sixth drivers 2 and 4 include a first pull-up driver P4 and a second pull-up driver P8, respectively, in order to pull-up drive the global input/output line in response to the output signals of the first and fourth drivers 11 and 31. In addition, the third and sixth drivers 2 and 4 include a first pull-down driver N4 and a second pull-down driver N8, respectively, in order to pull-down drive the global input/output line in response to the output signals of the second and fifth drivers 12 and 32.

Hereinafter, the operation of the repeater according to the present invention will be described in detail with reference to FIG. 2.

In the case of transmitting data from A to B, if the control signal CTRL has a high level, the control signal CTRLB has a low level. At this time, NMOSs of the second enable unit N1 and the fourth enable unit N2 and PMOSs of the first enable unit P1 and the third enable unit P2 of the first and second drivers 11 and 12 are turned ON, respectively. In addition, PMOS of the pull-up driver P3 and NMOS of the pull-down driver N3 of the first driver controller 5 are turned OFF.

Thus, the data signal of A is transferred to Node A and Node B. That is, if the data of A has a high level, Node A and Node B have low levels. Therefore, PMOS of the first pull-up driver P4 of the third driver 2 is turned ON and NMOS of the first pull-down driver N4 of the third driver 2 is turned OFF, so that data having a high level are transmitted to B. In addition, if the data of A has a low level, Node A and Node B have high levels. Therefore, PMOS of the first pull-up driver P4 of the third driver 2 is turned OFF and NMOS of the first pull-down driver N4 of the third driver 2 is turned ON, so that data having a low level are transmitted to B.

At this time, PMOSs of the fifth enable unit P5 and the seventh enable unit P6 of the fourth and fifth drivers 31 and 32 and NMOSs of the sixth enable unit N5 and the eighth enable unit N6 of the fourth and fifth drivers 31 and 32 are turned OFF and PMOS of the pull-up driver P7 is turned ON, so that Node C has a high level.

In addition, NMOS of the pull-down driver N7 has a high level so that Node D has a low level. The PMOS of the second pull-up driver P8 and the NMOS of the second pull-down driver N8 are turned OFF by Node C and Node D.

That is, if the control signal CTRL has a high level, data are transmitted from A to B and data transmission from B to A is blocked.

In the case of transmitting data from B to A, if the control signal CTRL has a low level, the control signal CTRLB has a high level. At this time, NMOSs of the sixth enable unit N5 and the eighth enable unit N6 and PMOSs of the fifth enable unit P5 and the seventh enable unit P6 of the fourth and fifth drivers 31 and 32 are turned ON, respectively. In addition, PMOS of the pull-up driver P7 and NMOS of the pull-down driver N7 are turned OFF.

Thus, the data signal of B is transferred to Node C and Node D. That is, if the data of B has a high level, Node C and Node D have low levels. Therefore, PMOS of the second pull-up driver P8 is turned ON and NMOS of the second pull-down driver N8 is turned OFF, so that data having a high level is transmitted to A. In addition, if the data of B has a low level, Node C and Node D have high levels. Therefore, PMOS of the second pull-up driver P8 is turned OFF and NMOS of the second pull-down driver N8 is turned ON, so that data having a low level is transmitted to A.

At this time, PMOSs of the first enable unit P1 and the third enable unit P2 of the first and second drivers 11 and 12 and NMOSs of the second enable unit N1 and the fourth enable unit N2 of the first and second drivers 11 and 12 are turned OFF and PMOS of the pull-up driver P3 is turned ON, so that Node A has a high level. In addition, NMOS of the pull-down driver N3 has a high level so that Node B has a low level. The PMOS of the first pull-up driver P4 and the NMOS of the first pull-down driver N4 are turned OFF by Node A and Node B.

That is, if the control signal CTRL has a low level, data are transmitted from B to A and data transmission from A to B is blocked.

Although preferred embodiments of the present invention have been disclosed for illustrative purposes, those skilled in the art will appreciate that various modifications, additions and substitutions are possible, without departing from the scope and spirit of the invention as defined in the accompanying claims.

The present disclosure claims priority to Korean application number 10-2007-0133641, filed on Dec. 18, 2007, the entire contents of which are incorporated herein by reference.

What is claimed is:

1. A repeater of a global input/output line, the repeater comprising:
   a first buffer unit configured to buffer data signals of the global input/output line;
   a first enable unit connected between a source voltage and the first buffer unit;
   a second enable unit connected between the first buffer unit and a ground voltage;
   a second buffer unit configured to buffer data signals of the global input/output line;
   a third enable unit connected between a source voltage and the second buffer unit;
   a fourth enable unit connected between the second buffer unit and a ground voltage; and
   a data output unit configured to drive the global input/output line in response to an output signal of the first buffer unit and an output signal of the second buffer unit;
   wherein the first to the fourth enable units are turned on simultaneously in response to the transmission direction control signal.

2. The repeater of claim 1, further comprising a driver controller configured to control an on-off operation of the data output unit in response to the transmission direction control signal.

3. The repeater of claim 2, wherein the driver controller includes a pull-up driver configured to pull-up drive an output terminal of the first buffer unit in response to the transmission direction control signal and a pull-down driver configured to pull-down drive an output terminal of the second buffer unit in response to the transmission direction control signal, and the data output unit is turned off when the transmission direction control signal is not activated.

4. The repeater of claim 1, wherein the data output unit includes:
   a pull-up driver configured to pull-up drive the global input/output line in response to an output signal of the first buffer unit; and
   a pull-down driver configured to pull-down drive the global input/output line in response to an output signal of the second buffer unit.

5. A repeater of a global input/output line, the repeater comprising:
   a first buffer unit configured to buffer data signals of the global input/output line;
   a first enable unit connected between a source voltage and the first buffer unit;
   a second enable unit connected between the first buffer unit and a ground voltage;
   a second buffer unit configured to buffer data signals of the global input/output line;
   a third enable unit connected between a source voltage and the second buffer unit;
   a fourth enable unit connected between the second buffer unit and a ground voltage;
   a first data output unit configured to drive the global input/output line in response to an output signal of the first buffer unit and an output signal of the second buffer unit;
   a third buffer unit configured to buffer data signals of the global input/output line;
   a fifth enable unit connected between a source voltage and the third buffer unit;
   a sixth enable unit connected between the third buffer unit and a ground voltage;
   a fourth buffer unit configured to buffer data signals of the global input/output line;
   a seventh enable unit connected between a source voltage and the fourth buffer unit;
   a eighth enable unit connected between the fourth buffer unit and a ground voltage; and
   a second data output unit configured to drive the global input/output line in response to an output signal of the third buffer unit and an output signal of the fourth buffer unit,
   wherein the first buffer unit, the second buffer unit and the first data output unit or the third buffer unit, the fourth buffer unit and the second data output unit are enabled according to the transmission direction control signal to allow the global input/output line to transmit data signals in bi-direction, and the first to the fourth enable units are turned on simultaneously when data signals of the global input/output line are output in a first signal direction in response to the transmission direction control signal, and the fifth to the eighth enable units are turned on simultaneously when data signals of the global input/output line are output in a second signal direction in response to the transmission direction control signal.

6. The repeater of claim 5, further comprising:
   a first driver controller configured to control an on-off operation of the first data output unit in response to the transmission direction control signal; and
   a second driver controller configured to control an on-off operation of the second data output unit in response to the transmission direction control signal.

7. The repeater of claim 6, wherein the first driver controller includes a pull-up driver configured to pull-up drive an output terminal of the first buffer unit in response to the transmission direction control signal and a pull-down driver configured to pull-down drive an output terminal of the second buffer unit in response to the transmission direction control signal, and the first data output unit is turned on/off according to an activation of the transmission direction control signal.

8. The repeater of claim 6, wherein the second driver controller includes a pull-up driver configured to pull-up drive an output terminal of the third buffer unit in response to the transmission direction control signal and a pull-down driver configured to pull-down drive an output terminal of the fourth buffer unit in response to the transmission direction control signal, and the second data output unit is turned on/off according to an activation of the transmission direction control signal.

9. The repeater of claim 5, wherein the first data output unit includes:
   a first pull-up driver configured to pull-up drive the global input/output line in response to an output signal of the first buffer unit; and
   a first pull-down driver configured to pull-down drive the global input/output line in response to an output signal of the second buffer unit.

10. The repeater of claim 9, wherein the second data output unit includes:
    a second pull-up driver configured to pull-up drive the global input/output line in response to an output signal of the third buffer unit; and
    a second pull-down driver configured to pull-down drive the global input/output line in response to an output signal of the fourth buffer unit.

* * * * *